Dec. 15, 1931.  W. I. CLEMENTS  1,836,644
DEVICE FOR CLARIFYING DRIVING VISION
Filed May 19, 1927
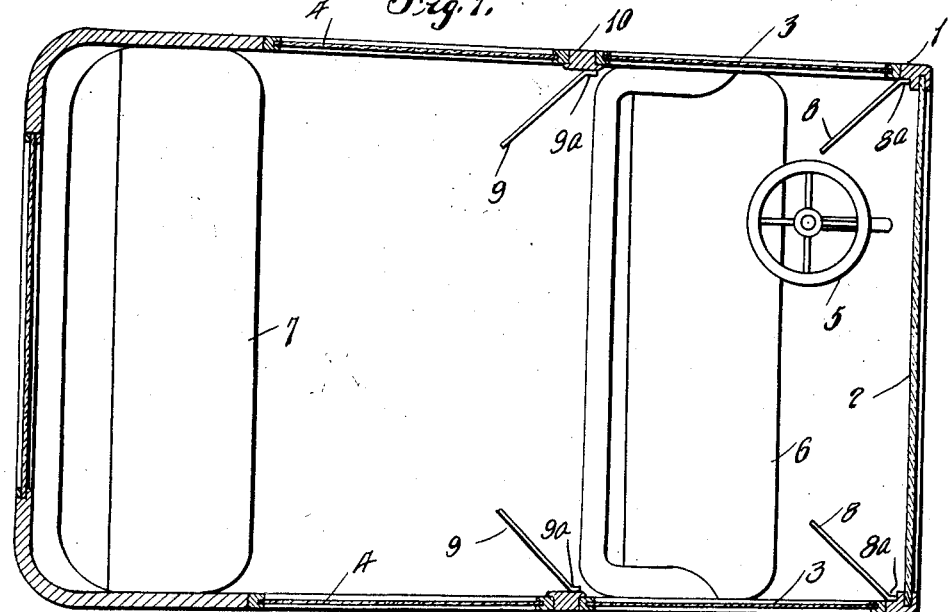
INVENTOR.
W. I. Clements.
BY
ATTORNEY.

Patented Dec. 15, 1931

1,836,644

UNITED STATES PATENT OFFICE

WELLINGTON I. CLEMENTS, OF NORFOLK, VIRGINIA

DEVICE FOR CLARIFYING DRIVING VISION

Application filed May 19, 1927. Serial No. 192,663.

This invention relates to automobiles and more particularly to automobiles of the closed body type.

The invention has for one of its objects to maintain the windshield and the front glass panels at the sides of an automobile free of the shadows of the sides of the automobile and free of the shadows of buildings, trees, store windows, street lamps and the like, whereby to insure such a clear and unobstructed vision for the driver as to reduce to the minimum the possibility of accidents especially while driving at night.

To attain the foregoing and other objects, the invention comprehends the employment of shields having such an arrangement with respect to the windshield and said glass panels of an automobile as to themselves cast a shadow on the windshield but prevent the casting of the objectionable shadows thereon.

The invention is hereinafter more fully described and claimed, and illustrated in the accompanying drawings, wherein:

Figure 1 is a horizontal sectional view illustrating the application of the invention to an automobile of the closed body type, Figure 2 is a vertical sectional view illustrating the application of a slightly modified form of the shields, Figure 3 is a sectional view taken on the horizontal plane indicated by the line 3—3 of Figure 2, Figure 4 is a detail perspective view of a further modified form of the shields, and Figure 5 is a sectional view taken on the vertical plane indicated by the line 5—5 of Figure 4.

Referring in detail to the drawings, 1 designates the front pillars, 2 the windshield, 3 the glass panels of the front doors, 4 the glass panels of the rear doors, 5 the steering wheel, 6 the front seat and 7 the rear seat of an automobile.

In accordance with my invention, opaque shields 8 are secured to the pillars 1 within the body of the automobile and at an angle of approximately forty-five degrees with respect to the windshield 2 and front door panels 3. Similar shields 9 are secured to the side pillars 10 of the automobile, and are arranged within the body of the automobile and at an angle of approximately forty-five degrees with respect to the rear door panels 4. The shields 8 and 9 are vertically disposed, and may extend from a plane coincident with the upper edge of the windshield 2 to a plane coincident with the lower edge of the windshield, or if desired they may be of such length as to occupy a position between the upper and the lower edges of the windshield. The shields 8 and 9 may be made of metal or other suitable material, and they may be painted or covered with any suitable material to correspond to the interior color scheme of the body of the automobile. The shields 8 and 9 are provided at their forward edges with flanges 8ª and 9ª, respectively, to permit them to be secured in place by screws or other suitable attaching elements.

As shown in Figures 2 and 3, the shields 8 and 9 may be mounted for vertical adjustment with respect to the windshield 2 and the door panels 3 and 4 so that they may be arranged at the required height or lowered to a position below the windshield and door panels. The shields 8 and 9, in order to permit this adjustment thereof, are slidably mounted upon vertical rods 11 which are secured to and within the body of the automobile in the manner indicated at 12. To adapt them for slidable connection with the rods 11, the shields 8 and 9 have their forward edge portions bent to provide sleeves 13 for the reception of the rods. The free edge portions of the sleeves 13 are connected to the shields 8 and 9 by bolts 14 and winged nuts 15 which parts permit the sleeves to be contracted to secure the shields against movement on the rods 11 and permit them to be loosened to permit the adjustment of the shields on the rods. When in inactive or lowered position, the front shields 8 may be swung beneath the cowl of the automobile and the rear shields 9 may be swung against the rear side of the front seat 6. If the body of the automobile is of the coach type, the back shields 9 may be, when in lowered or inactive position, swung against the sides of the body. When the shields 8 and 9 are in lowered positions, into which positions they are moved only when conditions are such as not to require their use, they will be out of the way of the occupants of the automobile and will not interfere with persons entering or leaving the automobile.

As shown in Figures 4 and 5, each of the shields may be adjustable so as to enable its effective width to be increased or decreased as conditions may require. To permit of this adjustment, each shield comprises a relatively fixed portion 16 which may be provided with an attaching flange 16$^a$ or an attaching sleeve 16$^b$, as indicated in dotted lines. The upper and lower edges of the shield section 16 are bent as indicated at 16$^c$ to provide channels for the slidable reception of the upper and lower edges of the relatively adjustable shield section 17, and to permit the section 16 to be adjusted horizontally with respect to the section 16 the former is provided at its rear edge with a tab 18.

When the automobile is of the coupé type, that is one having but a single seat, the front shields 8 are only employed.

As the shields occupy a vertical position and are arranged rearwardly of the windshield 2 and at an angle of approximately forty-five degrees with respect thereto, they will cast their own shadows on the windshield but will positively maintain the windshield 2 free of the shadows of the sides of the automobile and free of the shadows of buildings, trees, store windows, street lamps and the like. In view thereof the driver will be provided with such a clear and unobstructed vision as to reduce to the minimum the possibility of accidents especially while driving at night. The front shields will not, as tests have demonstrated, interfere with the driver's vision of the road through the windshield or through the forward portions of the glass panels of the front doors.

As should be apparent, the shields may be used in connection with store windows for the purpose of rendering the objects on display therein clearly visible, and when so used are arranged at an angle to the front and side panels of the windows.

It should be understood that the drawings are merely illustrative and do not pretend to give exact proportions. Furthermore, the said drawings are illustrative of a preferred construction, it being my expectation that various changes and modifications may be made without departing from the spirit and scope of my invention.

What is claimed is:—

In combination, the windshield of an automobile, and an upright opaque shield located in rear of the windshield and adjacent the lateral side thereof, said upright shield being arranged at an angle extending inwardly and rearwardly directly from one corner of the automobile with respect to one side of the automobile toward the longitudinal center line of the automobile and adapted to prevent other than its own shadow from being thrown on the windshield.

In testimony whereof I affix my signature.

WELLINGTON I. CLEMENTS.